US008406799B2

(12) United States Patent
Miller et al.

(10) Patent No.: US 8,406,799 B2
(45) Date of Patent: Mar. 26, 2013

(54) METHOD AND DEVICE FOR ESTABLISHING AN INTER-RADIO FREQUENCY SUBSYSTEM INTERFACE (ISSI) GROUP CALL

(75) Inventors: Trent J. Miller, West Chicago, IL (US); Rod N. Averbuch, Chicago, IL (US); Gerald R. Drobka, Naperville, IL (US); Peter M. Drozt, Prairie Grove, IL (US); Sikendar Fidai, South Barrington, IL (US); Michael F. Korus, Eden Prairie, MN (US); Todd A. Leigh, East Lansing, MI (US); Donald G. Newberg, Hoffman Estates, IL (US); Scott J. Pappas, Lake Zurich, IL (US); Brian R. Poe, Cary, IL (US); Steven E. Vanswol, Lombard, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 418 days.

(21) Appl. No.: 12/756,355

(22) Filed: Apr. 8, 2010

(65) Prior Publication Data

US 2011/0250922 A1 Oct. 13, 2011

(51) Int. Cl.
*H04B 7/00* (2006.01)
(52) U.S. Cl. ........................... 455/518; 455/519
(58) Field of Classification Search ........... 455/518–521
See application file for complete search history.

(56) References Cited

U.S. PATENT DOCUMENTS

| 2008/0181145 A1 | 7/2008 | Chowdhury et al. |
| 2008/0200162 A1 | 8/2008 | Chowdhury et al. |
| 2009/0005100 A1 | 1/2009 | Copeland |
| 2011/0250923 A1 | 10/2011 | Miller et al. |

OTHER PUBLICATIONS

PCT International Search Report Dated Jun. 14, 2011 for Counterpart Application.
PCT International Report Dated May 13, 2011 for Related U.S. Appl. No. 12/756,379.
Tom Hengeveld, et al. "Project 25 ISSI Support for Supplementary Data", Internet Citation, Mar. 20, 2006, pp. 1-35, XP002606152, Retrieved From Internet: URL:ftp//ftp.triaonline.org/tr-8/apic/psawg/06-035%20Supplementary%20Data%20Architecture.doc.

*Primary Examiner* — Raymond Dean
(74) *Attorney, Agent, or Firm* — Terri Hughes Smith; Steven A. May

(57) ABSTRACT

A hosted inter-radio frequency subsystem interface (HIF) maintains a list of affiliated radio frequency subsystems (RFSSs), the list identifies at least one serving RFSS. An affiliation request is transmitted from the HIF to the home RFSS, which is a home RFSS of the group. The HIF receives from the serving RFSS a request to initiate an inter-RFSS group call to the group using HIF addressing. The HIF transmits a request to the home RFSS to initiate the inter-RFSS group call using serving RFSS addressing. A data packet from the home RFSS or the serving RFSS is received at the HIF. Upon receipt, the HIF transmits a copy of the data packet to the serving RFSS if the data packet was received from the home RFSS; otherwise, the HIF transmits a copy of the data packet to the home RFSS if the data packet was received from the serving RFSS.

20 Claims, 10 Drawing Sheets

METHOD AND DEVICE FOR ESTABLISHING AN INTER-RADIO FREQUENCY SUBSYSTEM INTERFACE (ISSI) GROUP CALL

CROSS REFERENCE TO RELATED APPLICATION

This application is commonly owned by Motorola, Inc. and concurrently filed with the following U.S. patent application: Ser. No. 12/756,379 titled "METHOD AND DEVICE FOR ESTABLISHING AN INTER-RADIO FREQUENCY SUBSYSTEM INTERFACE (ISSI) UNIT-TO-UNIT CALL," which is incorporated herein by reference in its entirety.

FIELD OF THE DISCLOSURE

The present disclosure relates generally to wireless communication networks, and in particular to establishing an inter-radio frequency subsystem interface (ISSI) group call.

BACKGROUND

For many decades, half duplex two-way radio networks have provided reliable and convenient communications using limited shared radio resources. For example, "walkie-talkie" and citizens band (CB) radio networks have enabled users to maintain direct communication channels with other users over extended periods of time. The push-to-talk (PTT) and "instant on" features of half duplex radio devices provide desirable modes of wireless communication for users such as truckers, construction and industrial site personnel, military personnel, taxi dispatchers, police and fire personnel and numerous others. Many modern communication systems designed for public safety use group communications, which allow two or more participants to exchange voice, video, and other data. A floor control mechanism then dictates which device in the network is permitted to source media at a given time.

The Telecommunications Industry Association (TIA) Project 25 (P25) concerns a set of standards for digital radio communications for use by various emergency response teams. P25 was established to address the need for common digital public safety radio communications standards, including PTT communications standards. The P25 suite of standards involves digital land mobile radio (LMR) services commonly used by police and fire departments, and other public safety organizations. The P25 standards define numerous internet protocol (IP) interfaces. One such P25 interface, ISSI, supports interoperability between P25 systems. The ISSI for PTT was published by the TIA in the TIA.102.BACA-A document and related specifications. The ISSI provides network connectivity between P25 networks and enables network administrators to connect to other local, regional, state, or federal networks. A radio frequency subsystem (RFSS) contains a PTT server which is used during a P25 PTT session, and the ISSI enables communications between PTT servers in different RFSSs.

Referring to FIG. 1, a network diagram illustrates elements of a wireless communication network 100 including a hosted ISSI "wheel and spoke" architecture, according to the prior art. The network 100 includes P25 radios 105-$n$ that are in radio frequency (RF) communication with corresponding "home" RF subsystems 110-$n$. For example, the P25 radio 105-1 communicates over a common air interface with its home RFSS 110-1. Multiple P25 radio 105-$n$ can be registered with a RFSS 110-$n$. Each RFSS 110-$n$ is then operatively coupled via an IP network 115 to a simple SIP proxy 120. The simple SIP proxy 120 does not have a wide area communication network (WACN or System identifier (ID) assigned to it directly and the SIP proxy 120 merely routes data packets (including voice data and control messaging) between the RFSSs 110-$n$. Thus, for example, if the RFSS1 110-1 seeks to send a message to both the RFSS2 110-2 and the RFSS3 110-3, the RFSS1 110-1 must send two messages explicitly: a first message targeting the RFSS2 110-2 and a second message targeting the RFSS3 110-3.

The P25 radios 105-$n$, also referred to as units, are generally programmed with unique group identifiers, such as a WACN identifier, a system ID, a system group identifier (G-ID) or a local designation which can be converted to this information. A user of a P25 radio 105-$n$ generally is required to explicitly tune the radio 105-$n$, such as by turning a knob, to affiliate with a particular group using a group identifier. Directly or indirectly, this group is associated with a unique WACN identifier, system ID or G-ID. Groups can include any number of units and can be liberally defined to include units from different organizations or agencies. However, if a new group is defined at one RFSS 110-$n$, such as at RFSS 110-1, then configuration changes are required at other RFSSs 110-$n$ in the network 100, such as at RFSS 110-2 and RFSS 110-3.

Referring to FIG. 2, a network diagram illustrates elements of a wireless communication network 200 including an agency-based ISSI "point-to-point mesh" architecture, according to the prior art. Similar to the network 100 described above, the network 200 includes P25 radios 205-$n$ that are in RF communication with corresponding home RFSSs 210-$n$. For example, the P25 radio 205-1 communicates over an air interface with RFSS 210-1. However, each RFSS 210-$n$ is operatively coupled via an IP network 215 to another RFSS 210-$n$. Further, to interconnect to multiple remote RFSSs 110-$n$, a home RFSS 110-$n$ generally must interface with multiple IP networks, which increases security risks for the home RFSS 110-$n$.

ISSI connections between RFSSs, such as those illustrated by the lines 125 and 220 in FIGS. 1 and 2, respectively, are generally private IP connections, which use wired local area network (LAN) or wide area network (WAN) technologies, or wireless technologies. The ISSI connections are generally made across a common carrier, such as a T1 or multiprotocol label switching (MPLS) carrier.

The prior art ISSI wireless communication networks 100, 200 described above can have difficulties concerning end-user configuration complexity, security, scalability, and interoperability policy enforcement.

In addition, Terrestrial Trunked Radio (TETRA) is a standard of the European Telecommunications Standards Institute (ETSI) that, similar to Project 25, concerns digital LMR services for use primarily by police and fire departments, and other public safety organizations. TETRA is popular in many parts of Europe and Asia and has particular advantages including a long range and high spectral efficiency. Communications between independent TETRA networks can be established using an inter-system interface (ISI) that provides the required bandwidth and efficient inter-system signaling. The ISI also enables other functions such as inter-system mobility management and user authentication. These ISI wireless communication networks, however, can also experience the same difficulties as the ISSI wireless communication networks described above.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
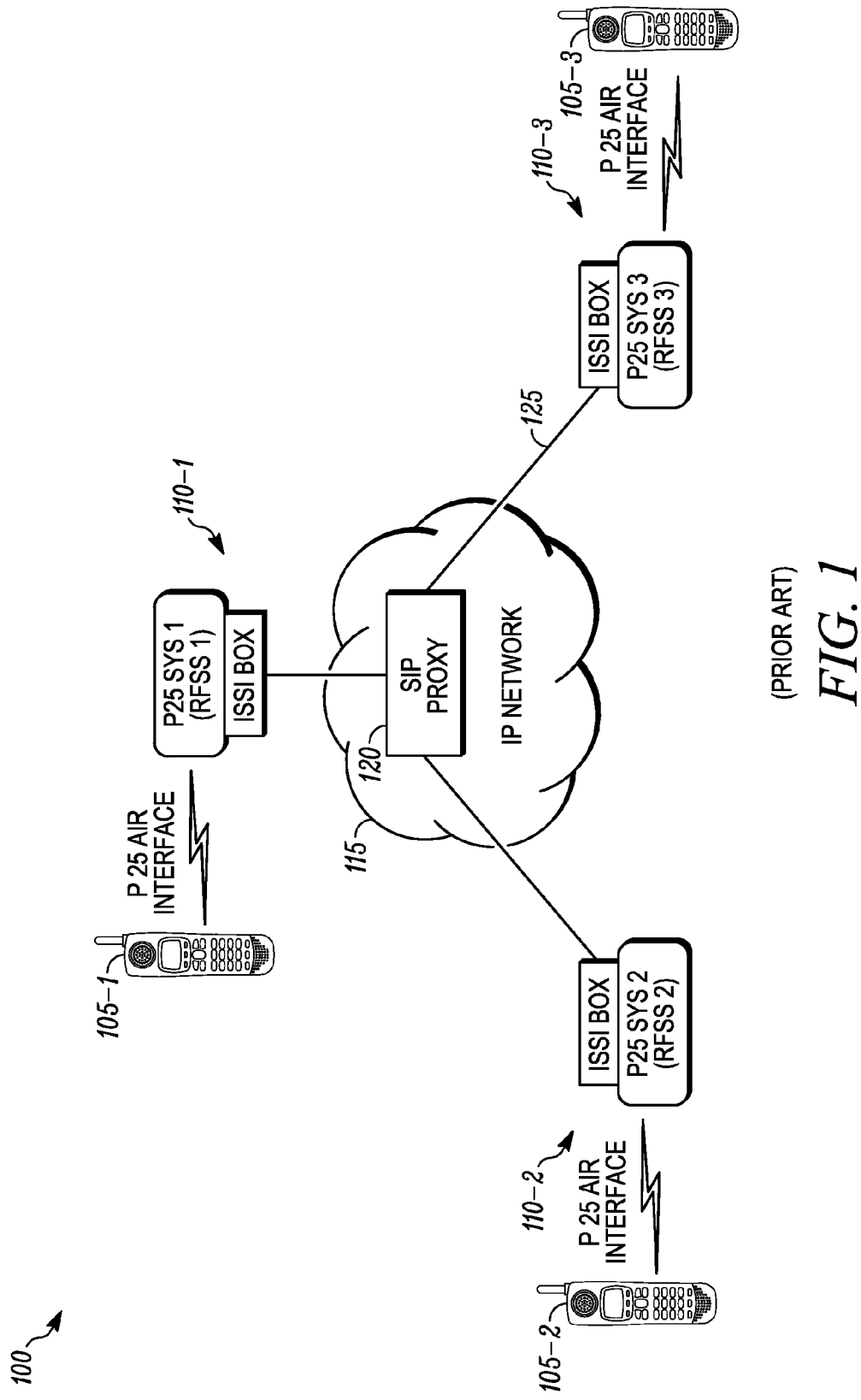
FIG. 1 is a network diagram illustrating elements of a wireless communication network including a hosted ISSI "wheel and spoke" architecture, according to the prior art.
Figure 2:
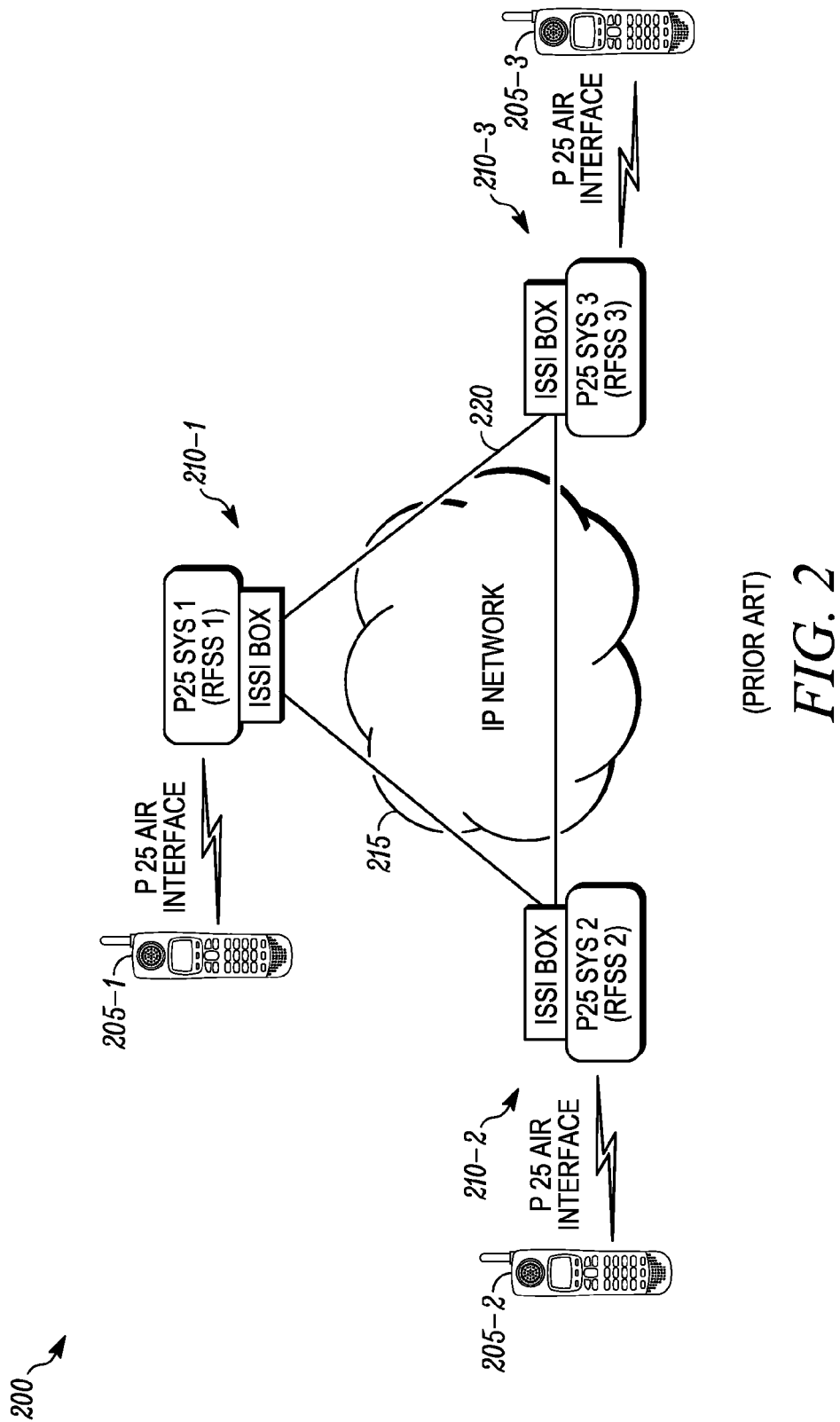
FIG. 2 is a network diagram illustrating elements of a wireless communication network including an agency-based ISSI "point-to-point mesh" architecture, according to the prior art.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

According to an embodiment of the present disclosure, a method enables establishing an ISSI group call through a HIF and between a home RFSS (e.g. RFSS1) and at least one serving RFSS (e.g. RFSS2). The method may include maintaining, at the HIF, a list of affiliated RFSSs, and the list identifies the at least one serving RFSS. An affiliation request is then transmitted from the HIF to the home RFSS, wherein the home RFSS is a home RFSS of the group. The HIF receives from the serving RFSS a request to initiate an inter-RFSS group call to the group using HIF addressing. A request is transmitted from the HIF to the home RFSS to initiate the inter-RFSS group call using serving RFSS addressing. A data packet from the home RFSS or the serving RFSS is received at the HIF. Upon receipt, the HIF transmits a copy of the data packet to the serving RFSS if the data packet was received from the home RFSS; otherwise, the HIF transmits a copy of the data packet to the home RFSS if the data packet was received from the serving RFSS. Optionally, the HIF may also transmit a copy of the data packet received to a plurality of serving RFSSs included in the list of affiliated RFSSs. Additionally, the HIF may have received a request to affiliate to a group using HIF addressing from the serving RFSS.

Embodiments of the present disclosure thus enable an HIF to track mobility at the RFSS level for all roaming subscriber units in a network, and to proxy all session initiation protocol (SIP) signaling and data packets from a single RFSS to all other RFSSs in the network. The HIF may copy data packets, as required, so that each RFSS can connect to a large number of other RFSSs through the HIF, while only locally having to generate or receive a single copy of data packets for each talk group. The copying of the data packets by the HIF increases calling capacity at each RFSS because it reduces the processing load at each RFSS. Network security is also improved by the centralization of call management. A data packet can also be an ISSI session/call control packet, floor control/transmission control packet (e.g. a request packet, a grant packet, etc.), or a media packet (e.g. voice, video, etc.). In this context, the word "copy" may or may not mean to create an exact copy of the received data packet. For example, the HIF may receive an ISSI Header Word indicating a group ID for the HIF from a serving RFSS. Before copying this packet and forwarding it to the group home RFSS, the group ID is changed to the home group ID used by the group home RFSS. As used in this description, the term "real G-ID" refers to a G-ID used by a group's home RFSS and refers directly to a talk group; whereas the term "alias G-ID" does not refer directly to a talk group.

Figure 3:
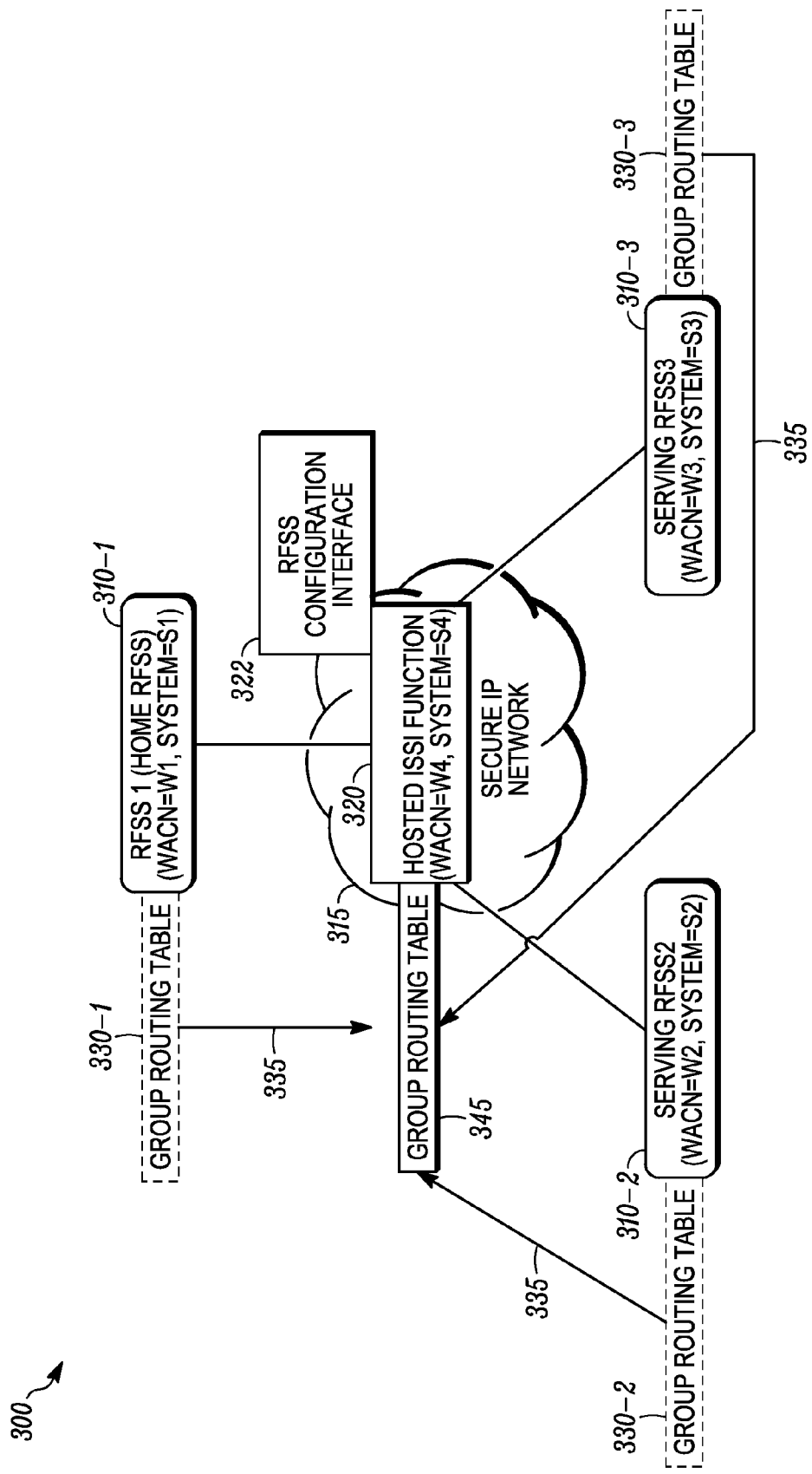
FIG. 3 is a network diagram illustrating elements of a wireless communication network including a hosted ISSI "wheel and spoke" architecture, according to an embodiment of the present disclosure.

Referring to FIG. 3, a network diagram illustrates elements of a wireless communication network 300 including a hosted ISSI "wheel and spoke" architecture, according to an embodiment of the present disclosure. Similar to the prior art network 100, the network 300 includes P25 radio units (not shown) that are in RF communication with corresponding home RFSS 310-*n*. However, unlike in the network 100, in the network 300 a HIF 320 may appear to serving RFSSs as an autonomous RFSS. Also, the HIF 320 may include its own unique WACN and system IDs, may use multiple WACNs and System IDs, or may reuse WACNs and System IDS assigned to other RFSSs. Further, data packets received from serving RFSSs terminate at the HIF 320 before they are replicated to the appropriate receiving RFSSs.

Multiple P25 radios may be registered with a RFSS 310-*n*. For example, in FIG. 3, the RFSS1 310-1 is identified as a home RFSS, and the RFSS2 310-2 and the RFSS3 310-3 are identified as serving RFSSs. A serving RFSS may have P25 radios that are affiliated to a group that is owned by a home RFSS. As will be understood by those having ordinary skill in the art, an RFSS 310-*n* may be of various types, including a P25 RFSS or a TETRA ISI RFSS.

Each RFSS 310-*n* may be operatively coupled via an IP network 315 to a HIF 320. Each RFSS 310-*n* may have a secure, unique configuration interface 322 at the HIF 320, which enables each RFSS 310-*n* to: (1) create new interoperable groups using a WACN/System ID of the HIF 310 and associate the group with the home RFSS, (2) define which remote RFSS 310-*n* may affiliate to the group, (3) define which units may affiliate to the group, and (4) define which other RFSSs 310-*n* a particular RFSS 310-*n* may communicate. A group routing table 330-*n* may also be associated with each RFSS 310-*n*. As shown by the arrows 335, data from each group routing table 330-*n* may be maintained in a HIF group routing table 345.

According to some embodiments of the present disclosure, HIF addressing refers to an alias group identifier that may be assigned to a group by a HIF. The identifier may have a one-to-one correspondence with a real group identifier in a home RFSS (e.g. RFSS1 310-1). To the real group home RFSS, the HIF group address may appear as the address of a serving RFSS. To a serving RFSS, the HIF group address may appear as the address of the group home RFSS.

RFSS addressing generally refers to the actual group identifier as used by the home RFSS of the group. RFSS addressing may be used only by the HIF and the home RFSS of the group. The HIF may use RFSS addressing to reach a serving RFSS or a home RFSS; however, a serving RFSS (i.e. a non-home RFSS) does not use RFSS addressing when participating in a group call.

The HIF 320 may track mobility for all roaming subscriber units, and may proxy all SIP signaling from a single RFSS 310-*n* to all other RFSSs 310-*n*. The HIF 320 may additionally copy data packets as required so that each RFSS 310-*n* may connect to a large number of other RFSSs 310-*n* through the HIF, while only locally having to generate or receive a single copy of the data packets for each talk group. Additionally, the HIF 320 may centralize configuration of talk groups and users and provide user group configuration policy enforcement and shared agency partitioning functions. To an existing RFSS 310-*n*, the HIF 320 may appear to be just another RFSS 310-*n*, and thus the HIF 320 may enable multiple RFSSs to be represented to another RFSS as a single RFSS. The HIF 320 thus may serve as a control and media replication engine for ISSI traffic, reducing the traffic load on other RFSSs 310-*n* in the network 300.

Figure 4:
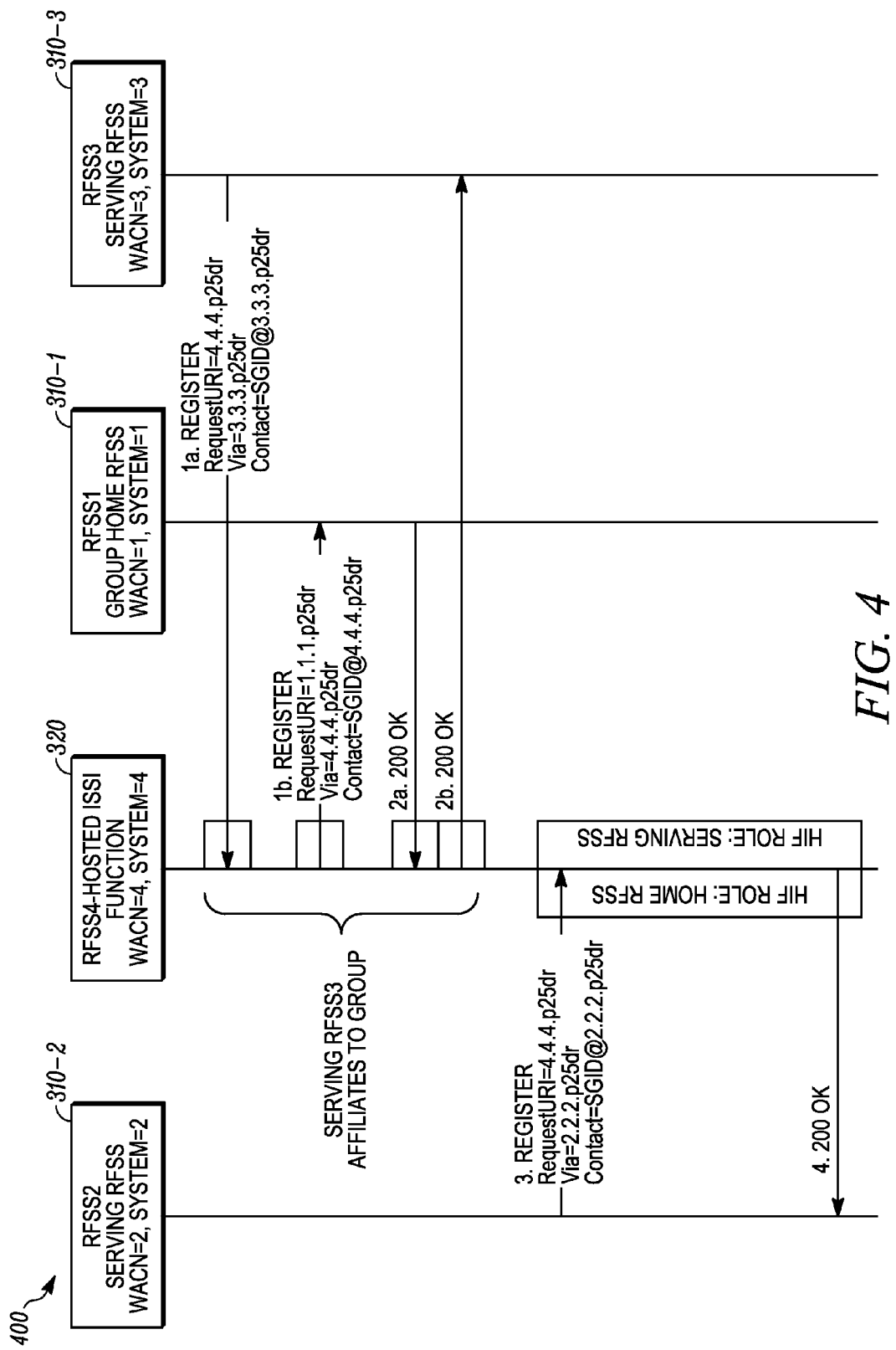
FIG. 4 is a message sequence chart illustrating an exemplary method for establishing an inter-RFSS interface group call through a hosted ISSI function (HIF) and between a home RFSS and at least one serving RFSS, according to an embodiment of the present disclosure.

Referring to FIG. 4, a message sequence chart illustrates an exemplary method 400 for establishing an ISSI group call through the HIF 320 and between the home RFSS (i.e. RFSS1 310-1) and at least one serving RFSS (i.e. RFSS2 310-2), according to an embodiment of the present disclosure. Those having ordinary skill in the art will recognize that for purposes of brevity and clarity, the message sequence charts of this disclosure do not illustrate all signalling messages actually used in a particular embodiment, but only those necessary to illustrate features of the present disclosure.

First, consider that the RFSS3 310-3 affiliates to the group. Such affiliation may comprise the RFSS3 310-3 transmitting a request to affiliate in the form of a session initiation protocol (SIP) REGISTER message 1*a* to the HIF 320. The message 1*a* may include, among other data, a Request uniform resource identifier (Request URI) address, a Via address, and a Contact address. The message 1*a* may be defined, for example, by the TIA standard "Project 25 (P25): Inter-RF Subsystem Interface Messages and Procedures for Voice Services," TIA-102.BACA-A. For each group defined at the HIF 320, the HIF 320 may track the real group home RFSS and all serving RFSSs. RFSS3 310-3 is a serving RFSS, and may use HIF addressing to communicate with the HIF 320. Acting as a proxy, the HIF 320 may then transmit a corresponding SIP REGISTER message 1*b*, including proxy address data, to the home RFSS1 310-1. Because, in message 1*b*, the HIF is communicating with the real group home RFSS (RFSS1, 310-1), the HIF addressing used by RFSS3 310-3 may be translated by the HIF to RFSS addressing. A SIP 200 OK message 2*a* may then be sent from the RFSS 1 310-1 to the HIF 320, and a SIP 200 OK message 2*b* may be sent from the HIF 320 to the RFSS3 310-3.

Next, consider that the RFSS2 310-2 affiliates to the group. Such affiliation may also comprise the RFSS2 310-2 transmitting a SIP REGISTER message 3 to the HIF 320. The message 3 may include, among other data, a Request URI address, a Via address, and a Contact address. A SIP 200 OK message 4 may then be sent from the HIF 320 to the RFSS2 310-2. In a similar fashion, any number of RFSSs 310-*n* may affiliate with the group.

Figure 5:
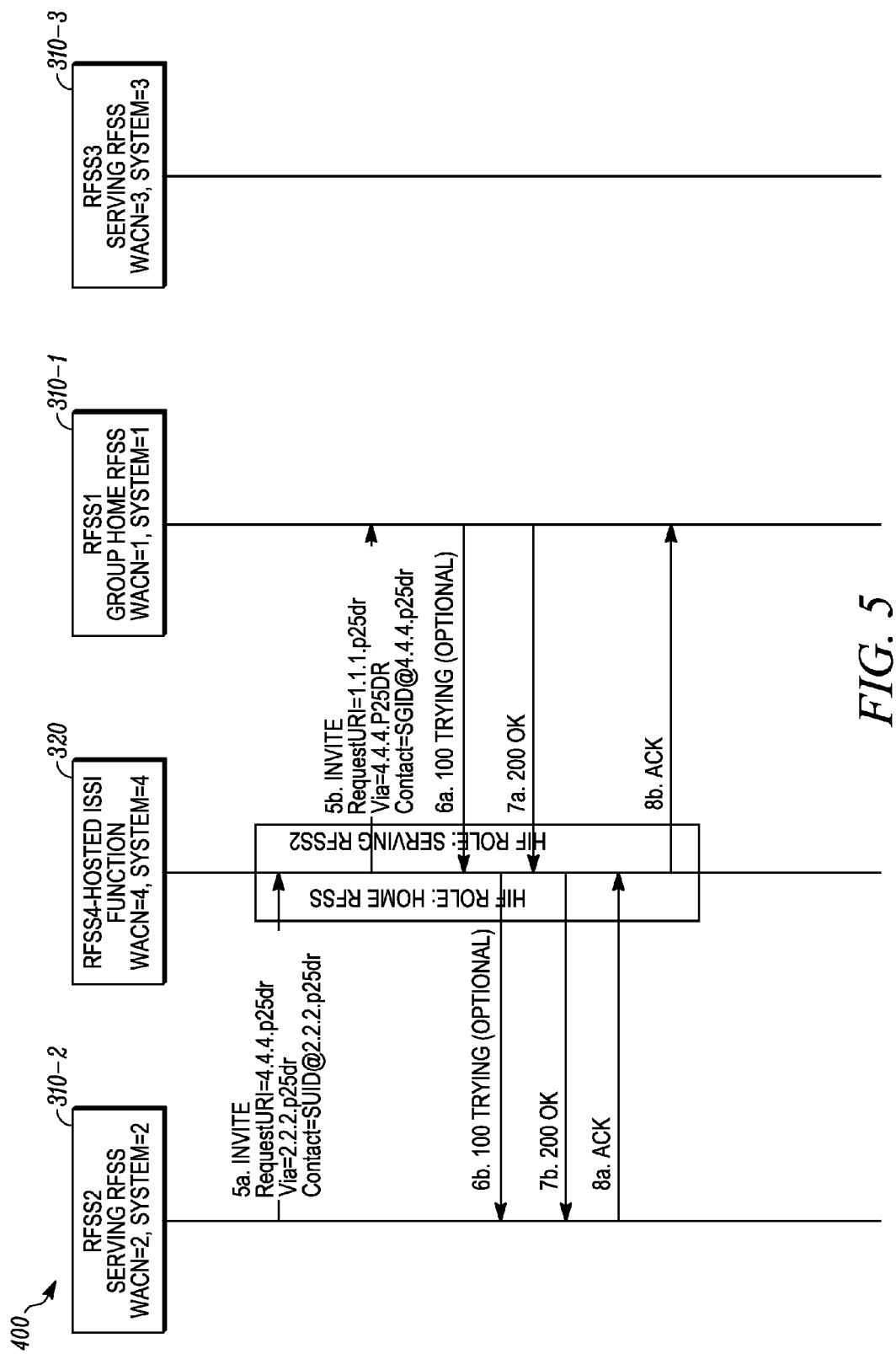
FIG. 5 is a message sequence chart illustrating a continuation from FIG. 4 of the method for establishing an inter-RFSS interface group call.

Referring to FIG. 5, a message sequence chart illustrates a continuation from FIG. 4 of the method 400. Consider that the RFSS2 310-2 seeks to initiate a group call. First, the RFSS2 310-2 may transmit a SIP INVITE message 5*a* to the HIF 320. The message 5*a* may include a Request URI address, a Via address, and a Contact address. Concerning message 5*a*, for a serving RFSS, such as RFSS2 310-2, destination SIP fields (such as the Request URI) may indicate the address of the HIF 320; the source SIP fields (such as Via and a Contact address) may indicate the serving RFSS, such as RFSS2 310-2. Acting as a proxy, the HIF 320 may then transmit a corresponding SIP INVITE message 5*b*, including proxy address data obtained from the group routing table 345, to the RFSS1 310-1. For message 5*b*, the HIF is the source of the message and destination SIP fields in the message may indicate the address of the real group home RFSS, RFSS1 310-1. The source SIP fields in message 5*b* may indicate the address of the HIF 320. Optionally, the RFSS1 310-1 may transmit a SIP 100 Trying message 6*a* to the HIF 320, and the HIF 320 may transmit a corresponding SIP 100 Trying message 6*b* to the RFSS2 310-2. After the INVITE message 5*b* is accepted, the RFSS1 310-1 may transmit a 200 OK message 7*a* to the HIF 320, and the HIF 320 may transmit a corresponding 200 OK message 7*b* to the RFSS2 310-2. A SIP ACK message 8*a* may then be transmitted from the RFSS2 310-2 to the HIF 320, and the HIF 320 may transmit a corresponding SIP ACK message 8*b* to RFSS1 310-1.

Figure 6:
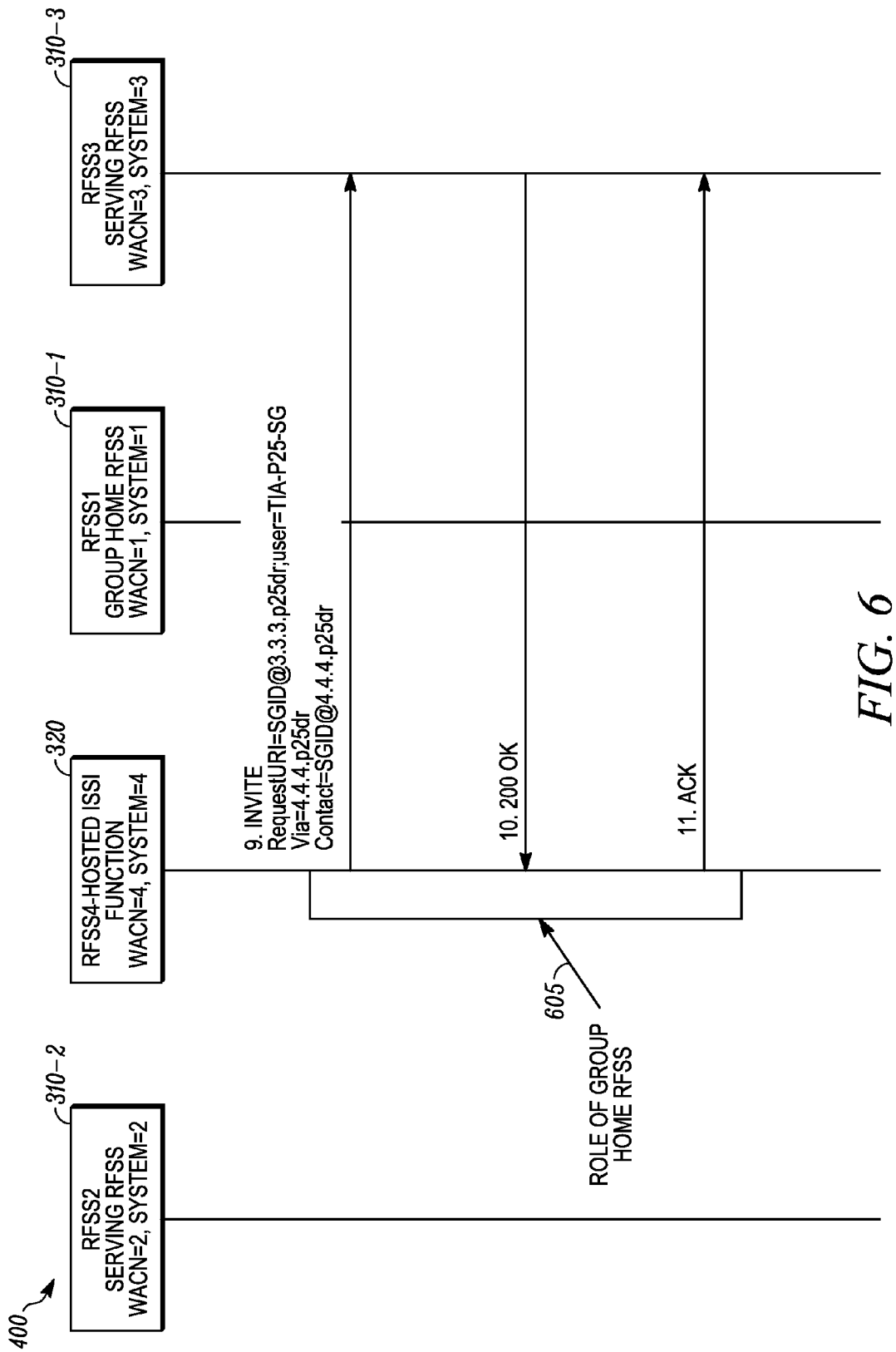
FIG. 6 is a message sequence chart illustrating a continuation from FIG. 5 of the method for establishing an inter-RFSS interface group call.

Referring to FIG. 6, a message sequence chart illustrates a continuation from FIG. 5 of the method 400. Using the list of RFSSs affiliated to the group, the HIF 320 may determine that it must invite RFSS3 to the group. Acting as a proxy, the HIF 320 may transmit a corresponding SIP INVITE message 9, including proxy address data, to the serving RFSS3 310-3. The message 9 may include a Request URI address, a Via address, and a Contact address. The RFSS3 310-3 may then transmit a 200 OK message 10 to the HIF 320, and the HIF 320 may transmit an ACK message 11 to the RFSS3 310-3.

In a similar manner, the HIF 320 acts as a proxy for all serving RFSSs 310-*n* that are affiliated with the group, and that are thus invited by the RFSS1 310-1 to participate in the group call. As shown by the arrow 605, the HIF 320 represents itself to the RFSS3 310-3 as a proxy for the RFSS 310-1.

Figure 7:
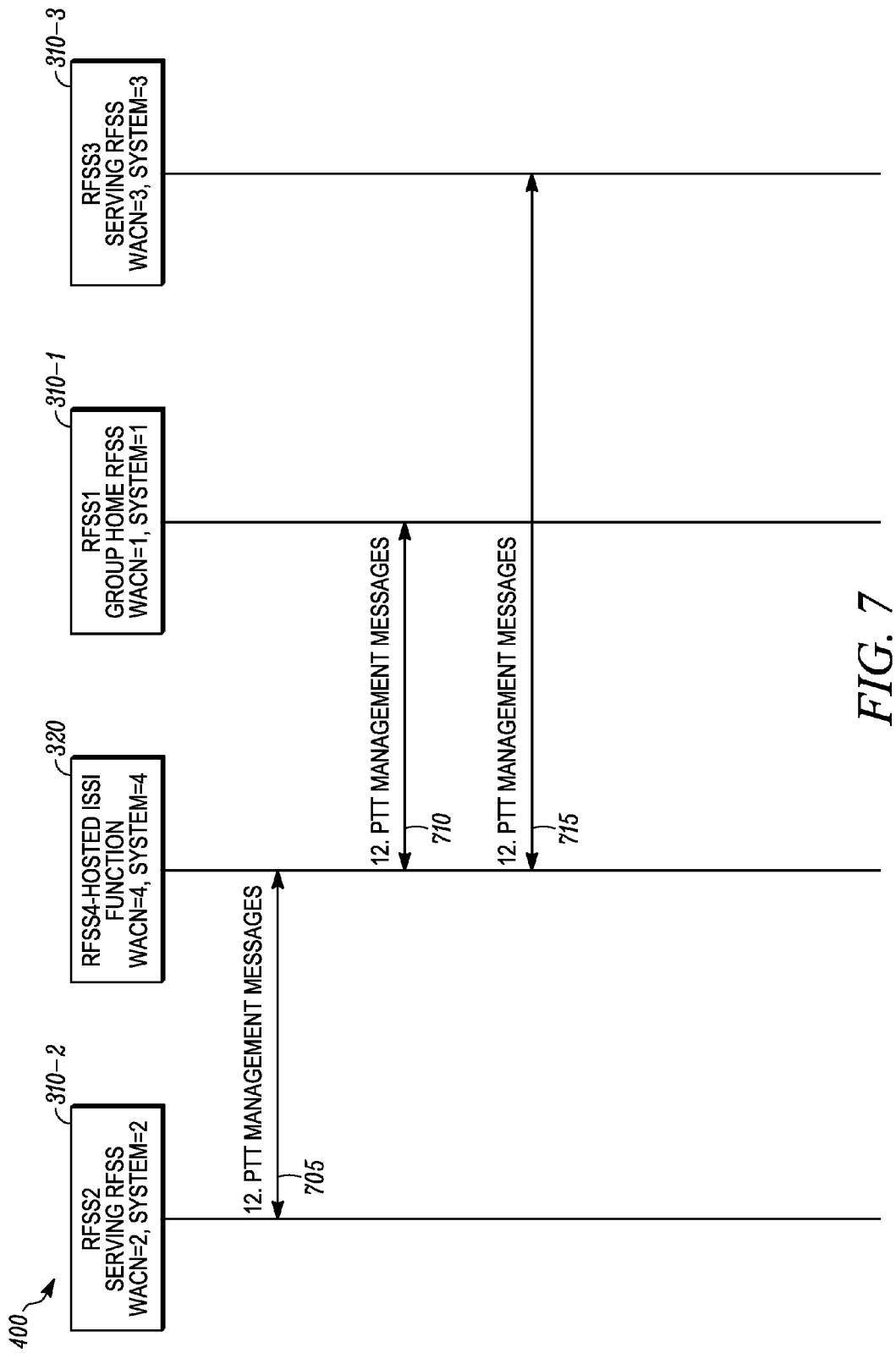
FIG. 7 is a message sequence chart illustrating a continuation from FIG. 6 of the method for establishing an inter-RFSS interference group call.

Referring to FIG. 7, a message sequence chart illustrates a continuation from FIG. 6 of the method 400. PTT management messages 705, 710, 715 from the RFSS1 310-1, RFSS2 310-2, and RFSS3 310-3 flow through the HIF 320 and may not be transmitted directly from one RFSS 310-*n* to another. For example, such PTT management messages may concern the following: requests by a serving RFSS for permission to transmit real time protocol (RTP) voice payload packets; queuing, granting or denying by a home RFSS of permission to transmit; initiation by a home RFSS of outbound talkspurts; propagation of voice by a home RFSS; management of losing audio by a given RFSS; termination of PTT transmission from a given RFSS; muting of undesired audio by a home or serving RFSS.

Figure 8:
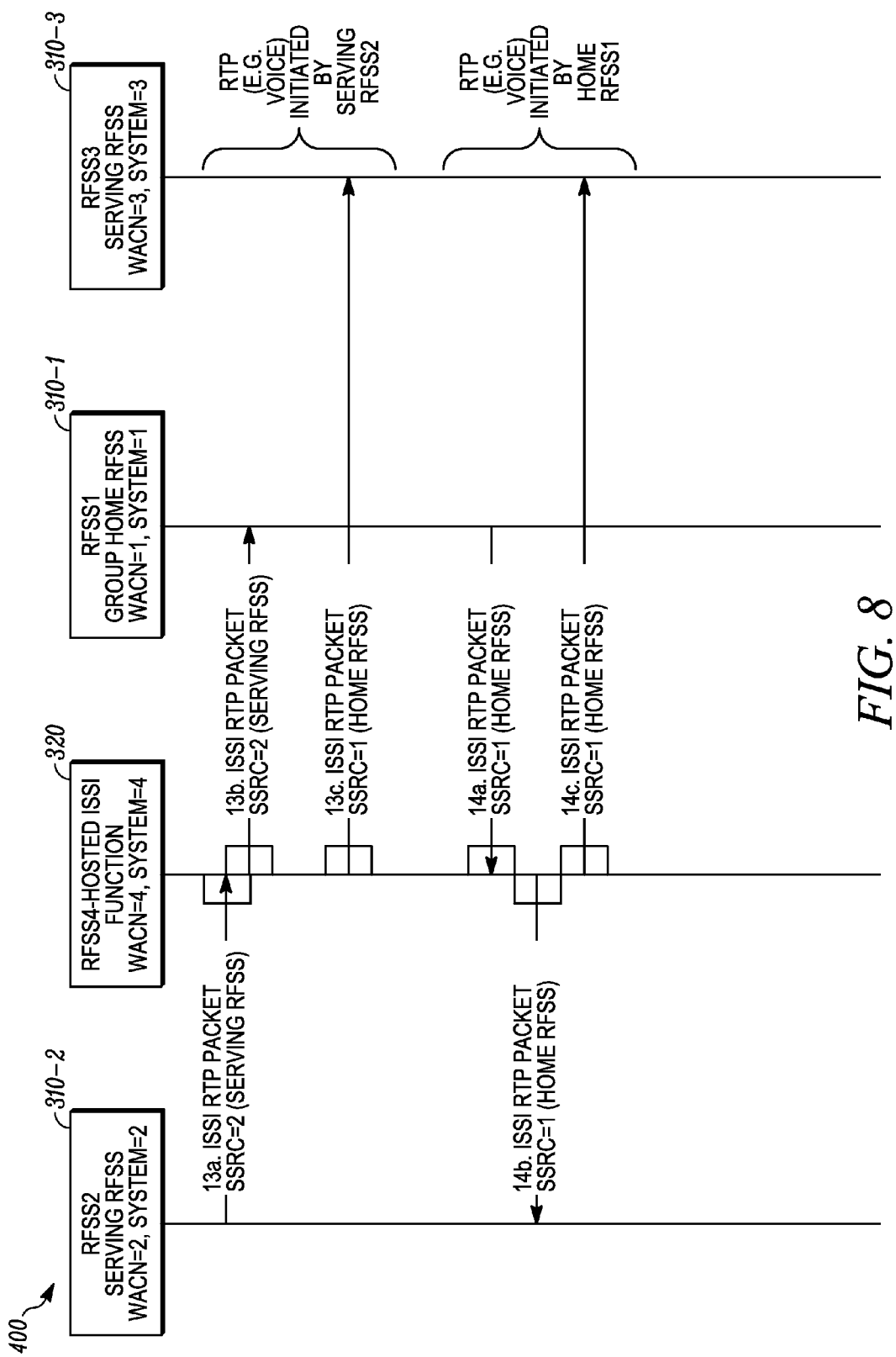
FIG. 8 is a message sequence chart illustrating a continuation from FIG. 7 of the method for establishing an inter-RFSS interface group call.

Referring to FIG. 8, consider that the RFSS2 310-2 now transmits data, such as voice data, as part of the group call. The RFSS2 310-2 therefore may transmit, at message 13*a*, an ISSI real-time transport protocol (RTP) data packet, such as a voice data packet, to the HIF 320. Acting as a proxy for the RFSS2 310-2, the HIF 320 may then modify the data packet received from the RFSS2 310-2 to identify the HIF 320 as the source, replicate the data packet and forward it, using addressing data from the group routing table 345, both to the RFSS1 310-1, at message 13b, and to the RFSS2 310-2, at message 13c.

Similarly, consider that the RFSS1 310-1 then responds with additional data, such as voice data, as part of the group call. At message 14a, the RFSS1 310-1 may transmit an ISSI RTP data packet to the HIF 320. Acting as a proxy for the RFSS1 310-1, the HIF 320 may then replicate the data packet and forward it both to the RFSS2 310-2, at message 14b, and to the RFSS3 310-3, at message 14c.

Figure 9:
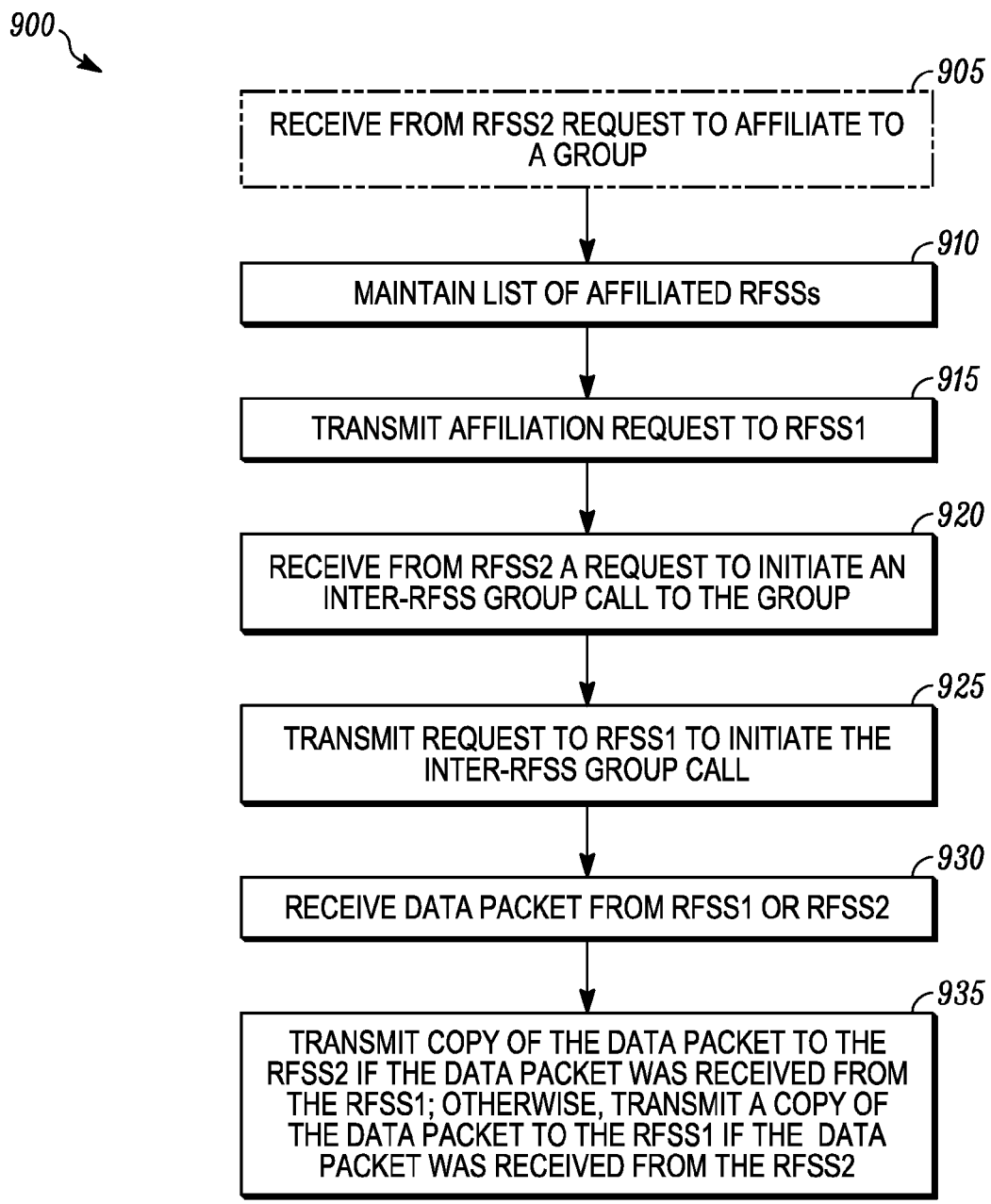
FIG. 9 is a general flow diagram illustrating a method for establishing an inter-RFSS interface group call through a HIF and between a home RFSS and at least one serving RFSS, according to an embodiment of the present disclosure.

Referring to FIG. 9, a general flow diagram illustrates an exemplary method 900 for establishing an ISSI group call through a HIF and between a home RFSS, RFSS1, and at least one serving RFSS, RFSS2, according to an embodiment of the present disclosure. At step 905, the HIF may receive from the RFSS2 a request to affiliate to a group using HIF addressing. At step 910, the HIF may maintain a list of affiliated RFSSs, wherein the list identifies at least RFSS2. At step 915, an affiliation request may be transmitted from the HIF to the RFSS1, wherein the RFSS1 is the home RFSS of the group. At step 920, the HIF may receive from the RFSS2 a request to initiate an inter-RFSS group call to the group using HIF addressing. At step 925, a request to initiate the inter-RFSS group call using RFSS2 addressing may be transmitted from the HIF to the RFSS1. At step 930, a data packet from the group call, such as a voice data packet, may be received at the HIF from the RFSS1 or the RFSS2. At step 935, a copy of the data packet is transmitted from the HIF to the RFSS2 if the data packet was received by the HIF from the RFSS1; otherwise, a copy of the data packet is transmitted from the HIF to the RFSS1 if the data packet was received by the HIF from the RFSS2. Optionally, the HIF may also transmit a copy of the data packet of all other serving RFSSs identified in the list of affiliated RFSSs.

Figure 10:
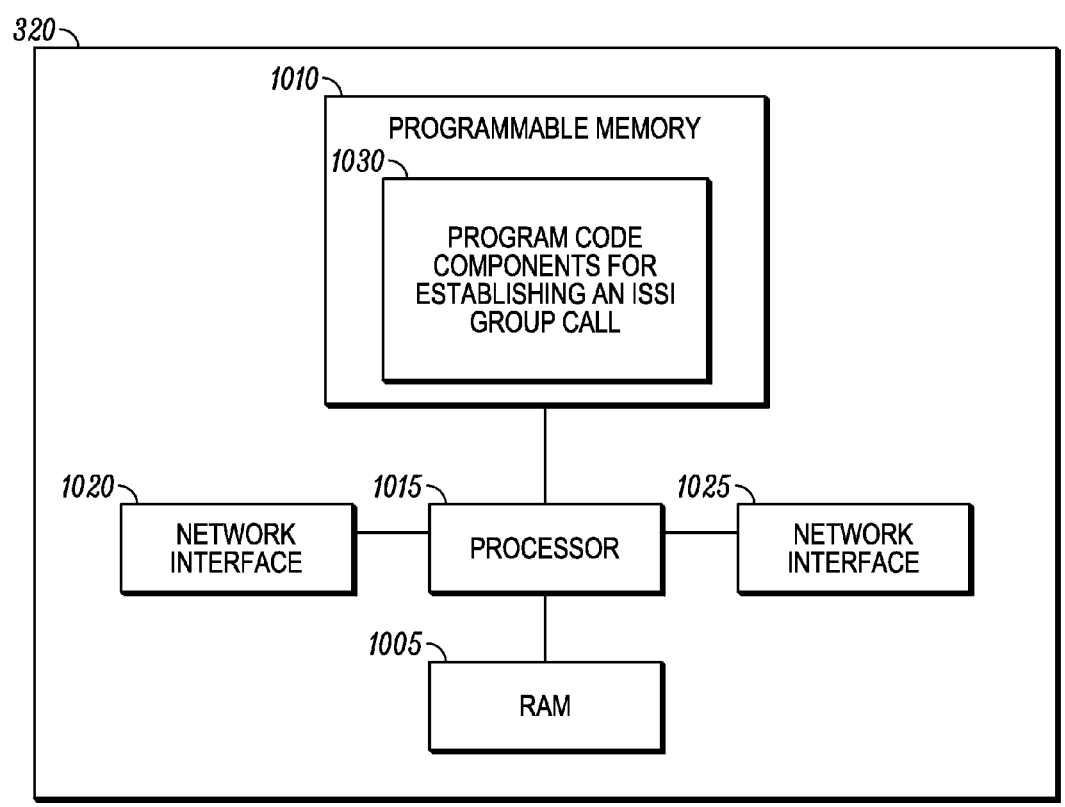
FIG. 10 is a block diagram illustrating components of a HIF device, according to an embodiment of the present disclosure Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

Referring to FIG. 10, a block diagram illustrates components of a HIF device, such as the HIF 320 described above, according to an embodiment of the present disclosure. The HIF 320, for example, may be included in various types of devices, including an integrated unit containing at least all the elements depicted in FIG. 10, as well as any other elements necessary for the HIF 320 to perform its particular functions. Alternatively, the HIF 320 may comprise a collection of appropriately interconnected units or devices, wherein such units or devices perform functions that are equivalent to the functions performed by the elements depicted in FIG. 10.

The HIF 320 may comprise a random access memory (RAM) 1005 and a programmable memory 1010 that are coupled to a processor 1015. The processor 1015 may also have ports for coupling to network interfaces 1020, 1025. The network interfaces 1020, 1025, which for example may be wired or wireless network interfaces, may be used to enable the HIF 320 to communicate with other network devices such as other RFSS system modules such as the RFSS2 310-2, RFSS administrator modules, central advertisement service systems, and P25 radios.

The programmable memory 1010 may store operating code (OC) for the processor 1015 and code for performing functions associated with a HIF. For example, the programmable memory 1010 may store computer readable program code components 1030 configured to cause execution of a method, such as the method 900, for establishing an ISSI group call through a HIF and between a home RFSS and at least one serving RFSS, as described herein.

Advantages of an embodiment of the present disclosure therefore include enabling an HIF, such as the HIF 320, to track the serving RFSS for all roaming subscriber radios, and to proxy all SIP signaling from a single RFSS to all other RFSSs in a network. The HIF can copy data packets as required so that each RFSS can connect to a large number of other RFSSs through the HIF, while only locally having to generate or receive a single copy of the data packets for each ISSI talk group. Network security is also improved by the centralization of call management.

References to specific protocol messages (e.g. SIP messages) in the above figures are purely conceptual. The figures are not intended to be semantically correct; rather then are intended to illustrate how key data items are modified and used in the disclosure. Those having ordinary skill in the art will recognize that for purposes of brevity and clarity, the message sequence charts of this disclosure do not illustrate all aspects of the protocol, but only those aspects that are necessary to illustrate features of the present disclosure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover, in this document relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g. comprising a processor) to perform a method as described and claimed herein. Examples of such computer-readable storage mediums include, but are not limited to, a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for establishing an inter-radio frequency subsystem interface (ISSI) group call through a hosted ISSI function (HIF) device and between a home radio frequency subsystem (RFSS) and at least one serving radio frequency subsystem, the method comprising:
maintaining, at the HIF device, a list of affiliated RFSSs, wherein the list identifies the at least one serving RFSS;
transmitting an affiliation request, from the HIF device to the home RFSS, wherein the home RFSS is a home RFSS of a group;
receiving, at the HIF device from the serving RFSS, a request to initiate an inter-RFSS group call to the group using HIF addressing;
transmitting, from the HIF device to the home RFSS, a request to initiate the inter-RFSS group call using serving RFSS addressing;
receiving, at the HIF device, a data packet from the home RFSS or the serving RFSS; and
transmitting, from the HIF device to the serving RFSS, a copy of the data packet if the data packet was received from the home RFSS; otherwise, transmitting, from the HIF device to the home RFSS, a copy of the data packet if the data packet was received from the serving RFSS.

2. The method of claim 1, wherein the HIF device transmits a copy of the data packet received to a plurality of serving RFSS included in the list of affiliated RFSSs.

3. The method of claim 1, wherein the HIF device enables multiple RFSSs to be represented as a single RFSS.

4. The method of claim 1, wherein the data packet is a voice data packet of the inter-RFSS group call.

5. The method of claim 1, wherein the HIF addressing comprises an alias group identifier.

6. The method of claim 1, wherein the serving RFSS addressing comprises a real group identifier.

7. The method of claim 1, wherein the home RFSS and the serving RFSS are each either a project 25 (P25) RFSS or a terrestrial trunked radio (TETRA) inter system interface (ISI) RFSS.

8. The method of claim 1, further comprising receiving, at the HIF device from the serving RFSS, a request to affiliate to a group using HIF addressing.

9. The method of claim 8, wherein the request to affiliate to the group using HIF addressing comprises transmitting a session initiation protocol (SIP) REGISTER message.

10. The method of claim 1, wherein transmitting the request from the HIF device to the home RFSS to initiate the inter-RFSS group call using serving RFSS addressing comprises transmitting a SIP INVITE message.

11. A hosted ISSI function (HIF) device comprising:
a processor; and
a memory coupled to the processor, the memory including:
computer readable program code for maintaining, at the HIF device, a list of affiliated radio frequency subsystems (RFSSs), wherein the list identifies at least one serving RFSS;
computer readable program code for transmitting, from the HIF device to a home RFSS, an affiliation request;
computer readable program code for receiving, at the HIF device from the serving RFSS, a request to initiate an inter-RFSS group call to the group using HIF addressing;
computer readable program code for transmitting, from the HIF device to the home RFSS, a request to initiate the inter-RFSS group call using serving RFSS addressing;
computer readable program code for receiving, at the HIF device, a data packet from the home RFSS or the serving RFSS; and
computer readable program code for transmitting, from the HIF device to the serving RFSS, a copy of the data packet if the data packet was received from the home RFSS; otherwise, transmitting from the HIF device to the home RFSS, a copy of the data packet if the data packet was received from the home RFSS.

12. The device of claim 11, wherein the HIF device transmits a copy of the data packet received to a plurality of serving radio frequency subsystems included in the list of affiliated radio frequency subsystems.

13. The device of claim 11, wherein the HIF device enables multiple RFSSs to be represented as a single RFSS.

14. The device of claim 11, wherein the data packet is a voice data packet of the group call.

15. The device of claim 11, wherein the HIF addressing comprises an alias group identifier.

16. The device of claim 11, wherein the serving RFSS addressing comprises a real group identifier.

17. The device of claim 11, wherein the home RFSS and the serving RFSS are each either a project 25 (P25) RFSS or a terrestrial trunked radio (TETRA) inter system interface (ISI) RFSS.

18. The device of claim 11, further comprising computer readable program code components for receiving at the HIF device from the serving RFSS a request to affiliate to a group using HIF addressing.

19. The device of claim 11, wherein the request transmitted from the HIF device to the home RFSS to initiate the inter-RFSS group call using serving RFSS addressing comprises transmitting an SIP INVITE message.

20. A hosted ISSI function (HIF) device for establishing an inter-radio frequency subsystem interface (ISSI) group call between a home radio frequency subsystem (RFSS) and at least one serving RFSS, the device comprising:

means for maintaining, at the HIF device, a list of affiliated RFSSs, wherein the list identifies the at least one serving RFSS;

means for transmitting, from the HIF device to the home RFSS, an affiliation request, wherein the home RFSS is a home subsystem of a group;

means for receiving, at the HIF device from the serving RFSS, a request to initiate an inter-RFSS group call to the group using HIF addressing;

means for transmitting, from the HIF device to the home RFSS, a request to initiate the inter-RFSS group call using serving RFSS addressing;

means for receiving, at the HIF device, a data packet from the home RFSS or the serving RFSS; and means for transmitting, from the HIF device to the serving RFSS2, a copy of the data packet if the data packet was received from the home RFSS; otherwise, transmitting, from the HIF device to the home RFSS, a copy of the data packet if the data packet was received from the serving RFSS.

\* \* \* \* \*